United States Patent
Kim et al.

(10) Patent No.: US 12,230,787 B2
(45) Date of Patent: Feb. 18, 2025

(54) CATHODE ACTIVE MATERIAL FOR RECHARGEABLE LITHIUM BATTERY COMPRISING COATING LAYER COMPRISING LITHIUM FLUORIDE AND METAL FLUORIDE AND METHOD FOR MANUFACTURING THE SAME

(71) Applicant: Samsung SDI Co., Ltd., Yongin-si (KR)

(72) Inventors: Soohyeon Kim, Yongin-si (KR); Jongmin Kim, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 620 days.

(21) Appl. No.: 17/250,665

(22) PCT Filed: Jun. 14, 2019

(86) PCT No.: PCT/KR2019/007216
§ 371 (c)(1),
(2) Date: Feb. 17, 2021

(87) PCT Pub. No.: WO2020/045802
PCT Pub. Date: Mar. 5, 2020

(65) Prior Publication Data
US 2021/0305550 A1    Sep. 30, 2021

(30) Foreign Application Priority Data
Aug. 27, 2018    (KR) .................. 10-2018-0100643

(51) Int. Cl.
*H01M 4/36* (2006.01)
*H01M 4/02* (2006.01)
(Continued)

(52) U.S. Cl.
CPC ......... *H01M 4/366* (2013.01); *H01M 4/0471* (2013.01); *H01M 4/505* (2013.01);
(Continued)

(58) Field of Classification Search
CPC .... H01M 4/136; H01M 4/366; H01M 4/0471; H01M 4/505; H01M 4/525; H01M 2004/021; H01M 2004/028
See application file for complete search history.

(56) References Cited

U.S. PATENT DOCUMENTS

| | | | |
|---|---|---|---|
| 6,291,101 B1 * | 9/2001 | Kita ................ | H01M 4/133 429/231.1 |
| 2009/0087362 A1 * | 4/2009 | Sun .................... | C01G 45/1242 423/179.5 |

(Continued)

FOREIGN PATENT DOCUMENTS

| CN | 103620834 A | 3/2014 |
|---|---|---|
| CN | 105684199 A | 6/2016 |

(Continued)

OTHER PUBLICATIONS

EPO machine generated English translation of KR 2017-0008164 A (Year: 2017).*

(Continued)

*Primary Examiner* — Christopher P Domone
*Assistant Examiner* — Kimberly Wyluda
(74) *Attorney, Agent, or Firm* — Lewis Roca Rothgerber Christie LLP

(57) ABSTRACT

Provided is a positive active material for a rechargeable lithium battery including a nickel-based composite oxide having a nickel content of greater than or equal to 60 mol % relative to a total amount of metal excluding lithium and a coating layer on the surface of the nickel-based composite oxide, wherein the coating layer includes lithium fluoride (Continued)

(LiF) and metal fluoride produced by firing a metal oxide and a fluorine-based organic material.

16 Claims, 5 Drawing Sheets

(51) Int. Cl.
  *H01M 4/04* (2006.01)
  *H01M 4/136* (2010.01)
  *H01M 4/505* (2010.01)
  *H01M 4/525* (2010.01)
  *H01M 10/0525* (2010.01)

(52) U.S. Cl.
  CPC ...... *H01M 4/525* (2013.01); *H01M 2004/021* (2013.01); *H01M 2004/028* (2013.01); *H01M 4/136* (2013.01); *H01M 10/0525* (2013.01)

(56) References Cited

U.S. PATENT DOCUMENTS

| | | | |
|---|---|---|---|
| 2014/0110641 A1 | 4/2014 | Murotani et al. | |
| 2014/0158932 A1* | 6/2014 | Sun | H01M 4/139 252/182.1 |
| 2014/0242463 A1 | 8/2014 | Song et al. | |
| 2015/0243974 A1* | 8/2015 | Holme | H01M 4/364 429/304 |
| 2016/0260979 A1 | 9/2016 | Park et al. | |
| 2016/0276659 A1 | 9/2016 | Choi et al. | |
| 2017/0018767 A1 | 1/2017 | Park et al. | |
| 2017/0018768 A1* | 1/2017 | Yushin | H01M 4/5835 |
| 2018/0019464 A1 | 1/2018 | Xia et al. | |
| 2018/0026267 A1 | 1/2018 | Kim et al. | |
| 2018/0034045 A1 | 2/2018 | Xia et al. | |
| 2020/0168908 A1* | 5/2020 | Kim | H01M 4/131 |

FOREIGN PATENT DOCUMENTS

| | | |
|---|---|---|
| CN | 106356507 A | 1/2017 |
| CN | 107210422 A | 9/2017 |
| CN | 107644982 A | 1/2018 |
| EP | 2763218 A2 | 8/2014 |
| EP | 3272711 A1 | 1/2018 |
| KR | 10-1049543 B1 | 7/2011 |
| KR | 10-2013-0033154 A | 4/2013 |
| KR | 10-1449807 B1 | 10/2014 |
| KR | 10-2015-0025563 A | 3/2015 |
| KR | 10-2015-0057990 A | 5/2015 |
| KR | 10-2016-0026402 A | 3/2016 |
| KR | 10-2017-0008164 A | 1/2017 |
| KR | 10-2018-0010123 A | 1/2018 |
| WO | WO 2012/176901 A1 | 12/2012 |

OTHER PUBLICATIONS

Myung, Seung-Taek, et al., "Effect of AlF3 Coating on Thermal Behavior of Chemically Delithiated Li0.35[Ni1/3Co1/3Mn1/3]O2," The Journal of Physical Chemistry C, vol. 114, No. 10, Feb. 2010, pp. 4710-4718.

EPO Extended European Search Report dated Jul. 28, 2022, issued in corresponding European Patent Application No. 19854544.4 (12 pages).

Yu, Hongbo, et al., "Preparation and characterization of high surface area α-AlF$_3$", Indian Journal of Chemistry, vol. 51A, Jul. 2012, pp. 927-930.

International Search Report for corresponding Application No. PCT/KR2019/007216 dated Sep. 20, 2019, 4pp.

Office Action dated Feb. 6, 2024 (including a Search Report dated Feb. 2, 2024), of the corresponding Chinese Patent Application No. 201980056732.3, 15pp including English translation.

\* cited by examiner

CATHODE ACTIVE MATERIAL FOR RECHARGEABLE LITHIUM BATTERY COMPRISING COATING LAYER COMPRISING LITHIUM FLUORIDE AND METAL FLUORIDE AND METHOD FOR MANUFACTURING THE SAME

CROSS-REFERENCE TO RELATED APPLICATION(S)

This application is a National Phase Patent Application of International Patent Application Number PCT/KR2019/007216, filed on Jun. 14, 2019, which claims priority of Korean Patent Application No. 10-2018-0100643, filed Aug. 27, 2018. The entire contents of both of which are incorporated herein by reference.

TECHNICAL FIELD

A positive active material for a rechargeable lithium battery, a method of preparing the same, and a rechargeable lithium battery including the same are disclosed.

BACKGROUND ART

As portable electronic devices, communication devices, and the like are developed, there are needs for development of a rechargeable lithium battery having a high energy density.

This rechargeable lithium battery includes a positive electrode and a negative electrode which include an electrode active material layer including an electrode active material formed on an electrode current collector. The positive active material is mostly an intercalation material of lithium ions, and may be oxides such as lithium cobalt oxide ($Li_xCoO_2$), lithium nickel oxide ($LixNiO_2$), lithium nickel cobalt oxide ($Li_x(NiCo)O_2$), lithium nickel cobalt manganese oxide ($Li_x(NiCoMn)O_2$), spinel-type lithium manganese oxide ($LixMn_2O_4$), manganese dioxide ($MnO_2$), or olivine-type or NASICON-type phosphates such as lithium iron phosphate ($Li_xFePO_4$), lithium manganese phosphate ($Li_xMnPO_4$), and the like, silicates, a polymer material, and the like. The negative active material may be a compound capable of intercalating lithium metal, its alloy or lithium ion, and may be a polymer material or a carbon material, for example a graphite-based material such as artificial or natural graphite, and the like, non-graphitizable carbon, or graphitizable carbon, carbon nanotube (CNT), a carbon nanofiber (CNF), a carbon nanowall (CNW).

DISCLOSURE

Technical Problem

An embodiment provides a positive active material for a rechargeable lithium battery capable of facilitating intercalation/deintercalation of lithium during charge and discharge and having excellent cycle-life characteristics and a low amount of residual lithium present on a surface.

Another embodiment provides a method of preparing the positive active material for a rechargeable lithium battery.

Another embodiment provides a rechargeable lithium battery including the positive active material for a rechargeable lithium battery.

Technical Solution

According to an embodiment, a positive active material for a rechargeable lithium battery includes a nickel-based composite oxide having a nickel content of greater than or equal to 60 mol % relative to a total amount of metal excluding lithium and a coating layer on the surface of the nickel-based composite oxide, wherein the coating layer is lithium fluoride (LiF); and a metal fluoride produced by firing a metal oxide and a fluorine-based organic material.

The nickel-based composite oxide may be a composite oxide represented by Chemical Formula 1.

[Chemical Formula 1]

In Chemical Formula 1, M is an element selected from boron (B), magnesium (Mg), calcium (Ca), strontium (Sr), barium (Ba), titanium (Ti), vanadium (V), chromium (Cr), iron (Fe), copper (Cu), zirconium (Zr), and aluminum (Al), $0.95 \le a \le 1.3$, $x \le (1-x-y-z)$, $y \le (1-x-y-z)$, $0 < x < 1$, $0 \le y < 1$, and $0 \le z < 1$.

The lithium fluoride and metal fluoride may be present in a form of nano-sized particulates.

The coating layer may include 10 wt % to 90 wt % of the lithium fluoride and 10 wt % to 90 wt % of the metal fluoride.

The metal oxide may be an oxide including an element selected from a transition metal other than nickel, a Group 13 element capable of reacting with fluorine, and a Group 14 element capable of reacting with fluorine.

The metal oxide may be selected from aluminum oxide, titanium oxide, zirconium oxide, and a combination thereof.

The fluorine-based organic material may have a melting point of 150° C. to 400° C.

The fluorine-based organic material may be a polymer or a mixture thereof prepared by polymerizing at least one monomer selected from vinylidene fluoride, tetrafluoroethylene, hexafluoropropylene, chlorotrifluoroethylene, vinyl fluoride, trifluoroethylene, hexafluoroisobutylene, perfluorobutylethylene, perfluoropropyl vinyl ether, perfluoroethyl vinyl ether, perfluoromethyl vinyl ether, perfluoro-2,2-dimethyl-1,3-dioxole, and perfluoro-2-methylene-4-methyl-1,3-dioxolane.

The nickel-based composite oxide may include a secondary particle in which a plurality of primary particles are agglomerated, wherein the secondary particle has a predetermined arrangement structure in which (003) planes of primary particles are aligned to be in a vertical direction with respect to a tangent line at a point (P) at which the (003) planes of the primary particles meet a surface of the secondary particle.

50% or more of the primary particles may be arranged to be in a vertical direction with respect to the tangent line at the point (P) at which the (003) planes meets the surface of the secondary particle.

A length in a thickness direction (length in the c-axis direction) of the primary particles may be in the range of 100 nm to 200 nm.

The secondary particle may have a radial array structure having one center or a multi-core radial array structure having a plurality of centers.

A pore volume fraction of micropores of less than or equal to 10 nm of the secondary particle may be greater than or equal to 10% of a total pore volume.

According to another embodiment, a method of preparing the positive active material for a rechargeable lithium battery includes heat-treating a mixture of a metal oxide and a fluorine-based organic material in an oxidizing atmosphere at a temperature equal to or higher than the melting point of the fluorine-based organic material in the presence of a nickel-based composite oxide having a nickel content of greater than or equal to 60 mol % relative to a total amount of metal excluding lithium.

The metal fluoride may be prepared by mixing a metal oxide and a fluorine-based organic material in a weight ratio of 30:70 to 70:30 and then firing them.

According to another embodiment, a rechargeable lithium battery includes the aforementioned positive electrode, a negative electrode, and an electrolyte.

Advantageous Effects

The positive active material for a rechargeable lithium battery may facilitate intercalation/deintercalation of lithium during charge and discharge, and effectively remove lithium present on the surface of the positive active material, thereby providing a rechargeable lithium battery with improved charging/discharging efficiency and cycle-life characteristics.

MODE FOR INVENTION

Figure 1:
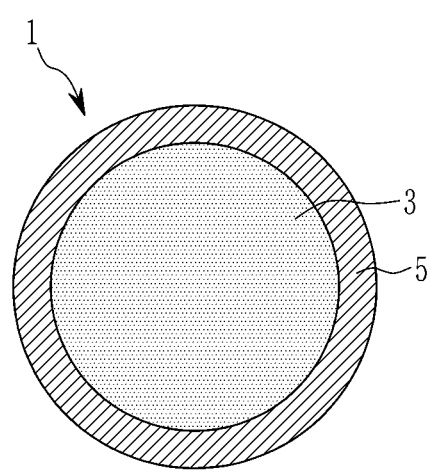
FIG. 1 is a schematic view of a positive active material for a rechargeable lithium battery according to an embodiment.

Hereinafter, embodiments will be described in detail so that those of ordinary skill in the art can easily implement them. However, embodiments may be embodied in many different forms and is not construed as limited to the embodiments set forth herein.

In the drawings, the thickness of layers, films, panels, regions, etc., are exaggerated for clarity.

The composite oxide having a high nickel content has a problem in that the safety of the battery is deteriorated because gas is generated due to a side reaction of lithium remaining on the surface. By supplying a compound capable of reacting with such residual lithium, residual lithium may be removed. When fluorine is supplied as a type of such a compound, lithium fluoride may be produced by a reaction of fluorine and residual lithium. However, since the lithium fluoride produced through the reaction interferes intercalation/deintercalation of lithium and in addition, does not effectively suppress the side reaction with an electrolyte solution, an effect of improving cycle-life characteristics may not be expected. In addition, when the nickel-based composite oxide is coated with a metal oxide, the side reaction with the electrolyte solution may be prevented to some extent, but metal fluoride may be produced through a reaction with HF in the electrolyte solution. When the nickel-based composite oxide is coated with the metal fluoride, the metal fluoride has no reactivity with the electrolyte solution and thus is the most stable but greatly deteriorates conductivity and thus interferes intercalation/deintercalation of lithium, and in addition, it is difficult to be formed into nano-sized particles and thus fail in obtaining a uniform coating layer. Accordingly, one embodiment of the present invention may provide a positive active material not interfering the intercalation/deintercalation of lithium but exhibiting improved cycle-life characteristics as well as reducing residual lithium on the surface thereof by forming a coating layer including lithium fluoride produced through a reaction of the residual lithium with fluorine of a fluorine-based organic material and metal fluoride produced by firing the fluorine-based organic material and a metal oxide.

Hereinafter, a positive active material for a rechargeable lithium battery according to an embodiment is described with reference to the drawings. FIG. 1 is a schematic view of a positive active material for a rechargeable lithium battery according to an embodiment.

According to an embodiment, a positive active material 1 for a rechargeable lithium battery includes a nickel-based composite oxide 3 having a nickel content of greater than or equal to 60 mol % relative to a total amount of metal excluding lithium and a coating layer 5 on the nickel-based composite oxide 3, wherein the coating layer 5 includes lithium fluoride (LiF) and metal fluoride produced by firing a metal oxide and a fluorine-based organic material.

The nickel-based composite oxide 3 may be a metal composite oxide represented by Chemical Formula 1.

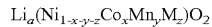   [Chemical Formula 1]

In Chemical Formula 1, M is an element selected from boron (B), magnesium (Mg), calcium (Ca), strontium (Sr), barium (Ba), titanium (Ti), vanadium (V), chromium (Cr), iron (Fe), copper (Cu), zirconium (Zr), and aluminum (Al), $0.95 \leq a \leq 1.3$, $x \leq (1-x-y-z)$, $y \leq (1-x-y-z)$, $0 \leq x<1$, $0 \leq y<1$, and $0 \leq z<1$.

In Chemical Formula 1, a may be in the range of $0.95 \leq a \leq 1.3$, for example $1.0 \leq a \leq 1.1$, and x may be in the range of $0<x \leq 0.33$, for example $0.1 \leq a \leq 0.33$, and y may be in the range of $0 \leq y \leq 0.5$, for example $0.05 \leq y \leq 0.3$, and z may be in the range of $0 \leq z \leq 0.05$, $0.33 \leq (1-x-y-z) \leq 0.95$. For example, in Chemical Formula 1, $0.33 \leq (1-x-y-z) \leq 0.95$.

In addition, in Chemical Formula 1, $0 \leq z \leq 0.05$, $0<x \leq 0.33$, and $0 \leq y \leq 0.33$. In Chemical Formula 1, z may be 0. In Chemical Formula 1, when x is in the range of $0 \leq z \leq 0.05$, M may be aluminum.

For example, the nickel-based composite oxide may be $LiNi_{0.6}Co_{0.2}Mn_{0.2}O_2$, $LiNi_{0.5}Co_{0.2}Mn_{0.3}O_2$, $LiNi_{0.33}Co_{0.33}Mn_{0.33}O_2$, $LiNi_{0.8}Co_{0.1}Mn_{0.1}O_2$, or $LiNi_{0.85}Co_{0.1}Al_{0.05}O_2$.

In the coating layer 5, the lithium fluoride and metal fluoride may be present in a form of nano-sized particulates. The size of these particulates may be greater than or equal to 5 nm, for example greater than or equal to 6 nm, or greater than or equal to 7 nm and less than or equal to 50 nm, less than or equal to 45 nm, or less than or equal to 40 nm. When the particulates of the coating layer have a size within the ranges, lithium may be easily intercalated/deintercalated during the charge and discharge, and in addition, the surface of the active material may be protected from the side reaction of the electrolyte solution, accomplishing uniform coating.

In the coating layer 5, the metal of the metal fluoride may be included in an amount of greater than or equal to 0.001 mol, greater than or equal to 0.01 mol, or greater than or equal to 0.1 mol and less than or equal to 1 mol, for example, less than or equal to 0.5 mol based on 100 mols of the transition metals (Ni+Co+Mn) of the nickel-based composite oxide 3. Within the ranges, cycle-life characteristics of the positive active material may be improved.

In the coating layer 5, the fluorine included in the lithium fluoride and the metal fluoride may be included in an amount of greater than or equal to 0.001 mol, greater than or equal to 0.01 mol, or greater than or equal to 0.1 mol and less than or equal to 1 mol, for example, less than or equal to 0.5 mol based on 100 mols of the transition metals (Ni+Co+Mn) of the nickel-based composite oxide 3. Within the ranges, the cycle-life characteristics of the positive active material may be improved.

In the coating layer 5, the lithium fluoride may be included in an amount of greater than or equal to 10 wt %, for example, greater than or equal to 15 wt %, or greater than or equal to 20 wt % and less than or equal to 90 wt %, for example, less than or equal to 85 wt %, or less than or equal to 80 wt %. In the coating layer 5, the metal fluoride may be included in an amount of greater than or equal to 10 wt %, for example, greater than or equal to 15 wt %, or greater than or equal to 20 wt % and less than or equal to 90 wt %, for example, less than or equal to 85 wt %, or less than or equal to 80 wt %. Within the ranges, the cycle-life characteristics of the positive active material may be improved, and stability also may be increased.

The metal fluoride may be obtained by heat-treating the metal oxide and the fluorine-based organic material at greater than or equal to the melting point of the fluorine-based organic material, for example, a fluorine-based polymer may be heat-treated at greater than or equal to 350° C., for example, greater than or equal to 400° C. and less than or equal to 650° C., for example, less than or equal to 550° C. In this respect, a fluorine-based organic material having a melting point of 150° C. to 400° C. may be used.

When the metal oxide and the fluorine-based organic material are fired, fluorine produced through the firing of the fluorine-based organic material is bonded with some or all of the metal oxide and thus produce the metal fluoride. When the fluorine is bonded with some of the metal oxide and produces the metal fluoride, the metal oxide may be present on the surface of the nickel-based composite oxide, and the metal fluoride may be present on the surface of the metal oxide and/or the interface of the nickel-based composite oxide and the metal fluoride. When the metal oxide is additionally present in the coating layer, conductivity of the coating layer 5 may be improved.

The metal fluoride may be prepared by mixing a metal oxide and a fluorine-based organic material in a weight ratio of 30:70 to 70:30 and then firing.

The metal oxide may be an oxide including an element selected from a transition metal other than nickel, a Group 13 element capable of reacting with fluorine, and a Group 14 element capable of reacting with fluorine. For example, the metal oxide may be selected from aluminum oxide, titanium oxide, zirconium oxide, and a combination thereof.

The fluorine-based organic material may be used without limitation as long as it is a polymer capable of supplying fluorine, for example a polymer or a mixture thereof prepared by polymerizing at least one monomer selected from vinylidene fluoride, tetrafluoroethylene, hexafluoropropylene, chlorotrifluoroethylene, vinyl fluoride, trifluoroethylene, hexafluoroisobutylene, perfluorobutylethylene, perfluoropropyl vinyl ether, perfluoroethyl vinyl ether, perfluoromethyl vinyl ether, perfluoro-2,2-dimethyl-1,3-dioxole, and perfluoro-2-methylene-4-methyl-1,3-dioxolane.

In an embodiment, the nickel-based composite oxide 3 may include a secondary particle in which a plurality of primary particles are agglomerated, wherein the secondary particle has a predetermined arrangement structure in which (003) planes of primary particles are aligned to be in a vertical direction with respect to a tangent line at a point (P) at which the (003) planes of the primary particles meet a surface of the secondary particle.

Hereinafter, a nickel-based composite oxide having the above structure will be described with reference to FIG. 2.

Figure 2:
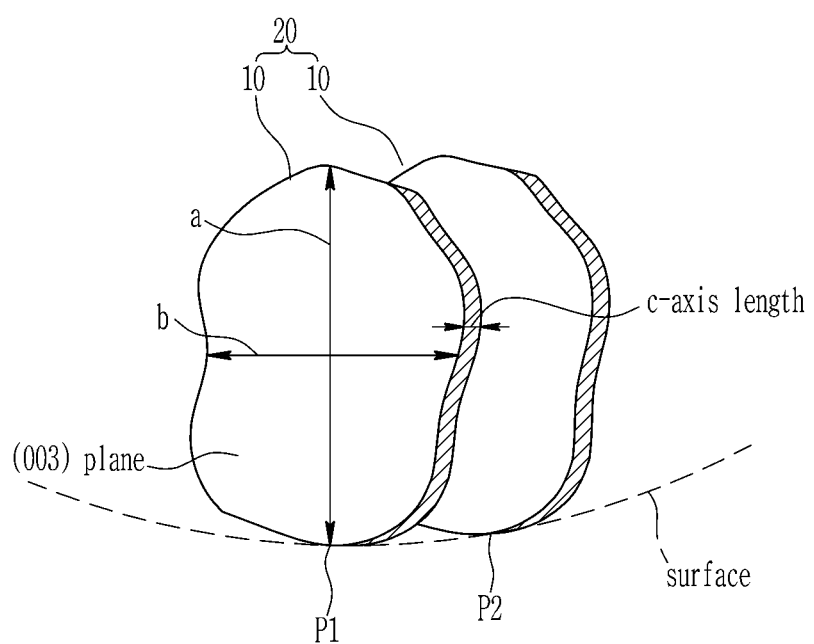
FIG. 2 is a view schematically showing arranged primary particles constituting a nickel-based composite oxide according to an embodiment.

FIG. 2 is a view schematically showing arranged primary particles constituting a nickel-based composite oxide according to an embodiment.

FIG. 2 shows only secondary particles composed of two primary particles, but it is obvious that three or more primary particles may be agglomerated to form secondary particles. Referring to FIG. 2, the primary particles are aligned perpendicularly to tangent lines at points (P1, P2) where long axes (a-axes) of (003) planes of the primary particles 10 meet the surface of the secondary particle and thus forms a certain arrangement structure. FIG. 2 shows that the primary particles are aligned, so that the long axes (a-axes) are perpendicular to the tangent lines at the points (P1, P2) where they meets the surface (marked by a dashed line) of the secondary particle, but so that short axes (b-axes) may be perpendicular to the tangent lines at the points (P1, P2) where they meets the surface of the secondary particle.

Herein, the surface denotes the surface of a circle or an oval formed by connecting points where long axes (a-axes) or short axes (b-axes) of neighboring primary particles meet the edge of the primary particles. In addition, the perpendicular direction means that the long axes (a-axes) or the short axes (b-axes) of the (003) planes meet the tangent lines with an angle of 90°±10°, for example, 90° 5° at the points (P1, P2) where the long axes (a-axes) or the short axes (b-axes) meet the surface of the secondary particle.

Greater than or equal to 50%, for example, greater than or equal to 60% or greater than or equal to 70% of the primary particles may be aligned in a perpendicular direction to the tangent lines at the points where the (003) planes thereof meet the surface of the secondary particle.

The primary particle 10 may have a plate shape, wherein a thickness (a length of a c-axis direction) of the primary particle may be smaller than that of the plane direction (the long axis (a-axis) or the short axis (b-axis)) thereof. The (003) plane of the primary particle 10 may have a rectangular, oval, hexagonal sheet, or amorphous shape in which the long axis (a-axis) and the short axis (b-axis) are different each other or a circular or square shape in which the long axis (a-axis) and the short axis (b-axis) are the same each other but is not limited thereto.

An average length of the plane direction (the long axis (a-axis) or the short axis (b-axis)) may be in a range of 150 nm to 500 nm, for example, 200 nm to 380 nm, and specifically, 290 nm to 360 nm. The average length of the plane direction indicates an average length of the long length and the short length.

A length of the thickness direction (the length of the c-axis direction) of the primary particle 10 may be in a range of 100 nm to 200 nm, for example, 120 nm to 180 nm, and specifically, 130 nm to 150 nm. In this way, since the thickness of the primary particle 10 is small, cracks that may occur during the contraction and expansion are reduced, improving cycle-life characteristics and suppressing resistance increase.

A ratio of the log side and the short side of a plane perpendicular to the (003) plane of the primary particle 10 may be in a range of 1:2 to 1:10, for example, 1:2.1 to 1:5, and specifically, 1:2.3 to 1:2.9.

The primary particles 10 aligned as described above are agglomerated each other and forms a secondary particle 20. For example, a plurality of the primary particles 10 are agglomerated one another and thus may provide a secondary particle with a radial arrangement structure.

The secondary particle 20 may have a particle size of 2 μm to 18 μm, for example, 8 μm to 15 μm, and specifically, 9 μm to 12 μm. Herein, the particle size indicates an average diameter, when the secondary particle 20 has a spherical shape. When the secondary particle 20 is oval, rod-shaped, amorphous, and the like, the particle size indicates a length of the long axis.

When the primary particles 10 are aligned perpendicularly to the tangent lines at the points (P1, P2) where the (003) planes thereof meet the surface of the secondary particle 20, relatively more lithium diffusion paths between grain boundaries may be provided toward a surface portion of the secondary particle 20, and crystal planes capable of diffusing lithium are more exposed, securing high initial efficiency and capacity. In addition, the cracks may be suppressed by suppressing a stress depending on a volume change of the secondary particle 20 during the charge and discharge.

In the present specification, a "surface portion" indicates an area of 30 to 50 length %, for example, 40 length % from the outermost surface of the secondary particle 20 out of a total distance from the center to the outermost surface thereof or an area within 2 μm from the outermost surface of the secondary particle 20. In addition, a "center portion" indicates an area of 50 to 70 length %, for example, 60 length % from the center of the secondary particle out of the total distance from the center of the secondary particle 20 to the outermost surface thereof or the other area excluding an area within 2 μm from the outermost surface of secondary particle 20.

In addition, when the primary particles 10, as shown in FIG. 2, are aligned in contact with each other, pores formed between the primary particles 10 are present on the surface portion of the secondary particle 20 and promote lithium diffusion from the surface.

The plurality of primary particles 10 are aligned to form a surface contact toward one center along the c-axis (thickness) direction of the primary particles 10 and thus may provide the secondary particle 20 with a radial arrangement structure.

In another embodiment, the secondary particle 20 may have a multi-center radial arrangement structure having a plurality of centers.

In this way, when the secondary particle 20 has a single-center or multi-center radial arrangement structure as described above, lithium is easily intercalated/deintercalated to the center of the secondary particle 20.

In one embodiment, the secondary particle 20 may have a pore volume fraction of micropores with a size of less than or equal to 10 nm in a range of greater than or equal to 10% based on a total volume of the pores. The micropores with a size of less than or equal to 10 nm may be located in the surface portion of the secondary particle 20. The primary particles 10 aligned in the surface contact make uniform contraction and expansion possible during the intercalation and deintercalation of lithium, and the micropores are present toward the surface portion of the secondary particle 20 toward where the primary particles 10 also expand during the deintercalation of lithium and thus act as a buffer.

In addition, in the center portion of the secondary particle 20, larger-sized pores may be formed than in the surface portion thereof. Herein, there is an effect of shortening a diffusion distance of lithium ions to the center portion. The pores in the center portion of the secondary particle 20 may have a pore size ranging from 150 nm to 1 μm, for example, 150 nm to 550 nm. Herein, the "pore size," when the pores are spherical-shaped or a circular-shaped, indicates an average diameter of the pores. When the pores are oval and the like, the pore size indicates a long-axis length. The secondary particle 20 includes a plurality of several nm-sized micropores between the primary particles in the surface portion, and through these micropores, lithium transfer from the electrolyte solution to the positive active material is maximized.

The positive active material has overall porosity of 1% to 8%, for example, 1.5% to 7.3%. The positive active material has smaller porosity in the surface portion than in the center portion. The porosity in the center portion may be in a range of 2% to 20%, for example, 3.3% to 16.5%, and the porosity in the surface portion may be 0.3% to 0.7%. In the present specification, the porosity is equally used to the pore volume fraction and expressed by a ratio of a pore area relative to a total area.

According to one embodiment, the nickel-based composite oxide includes a plurality of the secondary particles 20, and greater than or equal to 50%, for example, greater than or equal to 60%, or greater than or equal to 70% of the plurality of the secondary particles 20 may have a certain arrangement structure, for example, a radial arrangement structure. In this way, when the secondary particles have the constant arrangement structure, lithium diffusion may be facilitated, providing a rechargeable lithium battery with improved cycle-life characteristics.

The nickel-based composite oxide may be prepared by mixing a lithium precursor and a metal hydroxide precursor in a predetermined mole ratio and heat-treating the mixture under an oxidation atmosphere.

The lithium precursor may be, for example, lithium hydroxide, lithium fluoride, lithium carbonate, or a mixture thereof. As the metal hydroxide precursor, Me(OH)$_2$, wherein Me includes nickel, cobalt, manganese, and optionally M of Chemical Formula 1 may be used.

In an embodiment, the metal hydroxide precursor may be a compound represented by Chemical Formula 2.

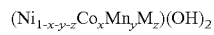  [Chemical Formula 2]

$(Ni_{1-x-y-z}Co_xMn_yM_z)(OH)_2$

In Chemical Formula 2, M is an element selected from boron (B), magnesium (Mg), calcium (Ca), strontium (Sr), barium (Ba), titanium (Ti), vanadium (V), chromium (Cr), iron (Fe), copper (Cu), zirconium (Zr), and aluminum (Al), $x \le (1-x-y-z), y \le (1-x-y-z), 0 < x < 1, 0 \le y < 1,$ and $0 \le z < 1$.

In Chemical Formula 2, $0 < x \le 0.33$, $0 \le y \le 0.5$, $0 \le z \le 0.05$, and $0.33 \le (1-x-y-z) \le 0.95$.

In Chemical Formula 2, $0.5 \le (1-x-y-z) \le 0.95$.

The metal hydroxide precursor of Chemical Formula 2 may be, for example, $Ni_{0.6}Co_{0.2}Mn_{0.2}(OH)_2$, $Ni_{0.5}Co_{0.2}Mn_{0.3}(OH)_2$, $Ni_{0.33}Co_{0.33}Mn_{0.33}(OH)_2$, or $Ni_{0.8}Co_{0.1}Mn_{0.1}(OH)_2$.

A mixing ratio of the lithium precursor and the metal hydroxide precursor is stoichiometrically adjusted to prepare the nickel-based composite oxide of Chemical Formula 1.

The mixing may be dry mixing, and may be performed using a mixer or the like.

The dry mixing may be performed through milling. Herein, the milling is conducted to almost not cause modification such as pulverization of the metal hydroxide precursor used as a starting material and the like. For this, a size of a lithium precursor mixed with the metal hydroxide precursor needs to be controlled in advance. The size (average particle diameter) of the lithium precursor may be in a range of 5 μm to 20 μm, for example, about 10 μm. The lithium precursor and the metal hydroxide precursor are mixed through the milling at 300 rpm to 3,000 rpm.

In the aforementioned milling process, when an internal temperature of a mixer is increased to greater than or equal to 30° C., a cooling process of keeping the internal temperature within room temperature (20° C. to 25° C.) may be performed.

A heat treatment for preparing the nickel-based composite oxide is performed under an oxidation atmosphere. The oxidation atmosphere may use oxidizing gas such as oxygen or air. In one embodiment, the oxidation gas may consist of 10 volume % to 30 volume % of oxygen, 70 volume % to 90 volume % of inert gas, for example, 10 volume % to 20 volume % of oxygen or air and 80 volume % to 90 volume % of inert gas.

The heat treatment process may be, for example, performed at 600° C. to 800° C., for example, 650° C. to 800° C. In the heat treatment, the temperature is increased at 1° C./min to 5° C./min, for example, 3° C./min. The heat treatment time varies depending on a heat treatment temperature at a high temperature, etc. but may be, for example, 3 hours to 10 hours.

According to another embodiment, a method of preparing the positive active material for a rechargeable lithium battery includes heat-treating a mixture of a metal oxide and a fluorine-based organic material in an oxidizing atmosphere at a temperature equal to or higher than the melting point of the fluorine-based organic material in the presence of a nickel-based composite oxide having a nickel content of greater than or equal to 60 mol % relative to a total amount of metal excluding lithium.

The nickel-based composite oxide, the metal oxide, and the fluorine-based organic material are the same as illustrated above.

The heat treatment process may be performed at greater than or equal to a melting point of the fluorine-based organic material, for example, greater than or equal to 350° C., for example, greater than or equal to 400° C. and less than or equal to 650° C., for example, less than or equal to 550° C. Within the ranges, metal fluoride may be effectively produced from the metal oxide and the fluorine-based organic material, and residual lithium may be effectively removed. In addition, when the heat treatment process is performed at less than or equal to 550° C., the metal oxide may exist in the coating layer and thus improve conductivity of the coating layer.

The oxidation atmosphere may be an oxygen or air atmosphere, and the air atmosphere may be a decarbonized air atmosphere.

An embodiment provides a rechargeable lithium battery including the positive active material. The rechargeable lithium battery includes a positive electrode including the positive active material, a negative electrode, an electrolyte, and a separator.

The positive electrode and the negative electrode are manufactured by coating each of a composition for forming a positive active material layer and a composition for forming a negative active material layer on a current collector, and drying the composition.

The composition forming the positive active material layer is formed by mixing a positive active material, a conductive agent, a binder, and a solvent, and the positive active material is as described above.

The binder is a component that assists in binding of the active material to the conductive agent and to the current collector. The binder is added in an amount of 1 to 50 parts by weight based on 100 parts by weight of the positive active material. When the amount of the binder is in the above range, a binding force of the active material layer to the current collector is improved.

Non-limiting examples of the binder may be polyvinylidene fluoride, polyvinyl alcohol, carboxylmethyl cellulose (CMC), starch, hydroxypropyl cellulose, regenerated cellulose, polyvinylpyrrolidone, tetrafluoroethylene, polyethylene, polypropylene, an ethylene-propylene-diene terpolymer (EPDM), sulfonated EPDM, a styrene butadiene rubber, a fluorine rubber, various copolymers.

The conductive agent may be not particularly limited as long as it has electron conductivity without causing chemical changes in a battery and may be, for example graphite such as natural graphite or artificial graphite; a carbon-based material such as carbon black, acetylene black, ketjen black, channel black, furnace black, lamp black, thermal black and the like; a conductive fiber such as a carbon fiber or a metal fiber; carbon fluoride; a metal powder such as aluminum or a nickel powder; a conductive whisker such as zinc oxide, or potassium titanate; a conductive metal oxide such as titanium oxide; a conductive material such as a polyphenylene derivative.

An amount of the conductive agent may be 2 to 5 parts by weight based on 100 parts by weight of the positive active material. When the amount of the conductive agent is in the above range, conductivity of the finally obtained electrode is improved.

Non-limiting examples of the solvent include N-methylpyrrolidone and the like.

An amount of the solvent is 1 to 10 parts by weight based on 100 parts by weight of the positive active material. When the amount of the solvent is in the range, it is easy to work to form the active material layer.

The positive current collector is 3 μm to 500 μm thick and is not particularly limited if it has high conductivity without causing chemical changes in the battery, and may be for example, stainless steel, aluminum, nickel, titanium, heat-treated carbon, or aluminum or stainless steel which is surface-treated with carbon, nickel, titanium, silver, and the like. The current collector may form a fine concavo-convex on its surface to enhance an adherence of positive active materials and may be in various forms such as films, sheets, foils, nets, porous bodies, foams, and nonwoven fabric bodies.

Separately, a composition for forming a negative active material layer is prepared by mixing a negative active material, a binder, a conductive agent, and a solvent.

The negative active material may be a material capable of intercalating and releasing lithium ions. As non-limiting examples of the negative active material, a carbon-based material such as graphite or carbon, a lithium metal, an alloy thereof, and a silicon oxide-based material may be used. According to an embodiment of the present invention, silicon oxide may be used.

The binder is added in an amount of 1 to 50 parts by weight based on 100 parts by weight of the negative active material. Non-limiting examples of such binder may be the same types of materials as the positive electrode.

The conductive agent is added in an amount of 1 to 5 parts based on 100 parts by weight of the negative active material. When the amount of the conductive agent is in the range, conductivity characteristics of the finally obtained electrode are improved.

An amount of the solvent is 1 to 10 parts by weight based on 100 parts by weight of the negative active material. When the amount of the solvent is in the range, it is easy to work to form the negative active material layer.

The conductive agent and the solvent may be the same types of materials as the positive electrode.

The negative current collector may have a thickness of 3 μm to 500 μm. Such a negative current collector is not particularly limited if it has high conductivity without causing chemical changes in the battery and may be, for example, copper, stainless steel, aluminum, nickel, titanium, heat-treated carbon, copper or stainless steel which is surface-treated with carbon, nickel, titanium, silver, and the like, an aluminum-cadmium alloy, and the like. In addition, the negative current collector may form a fine concavo-convex on its surface to enhance an adherence of negative active materials and may be in various forms such as films, sheets, foils, nets, porous bodies, foams and nonwoven fabric bodies, like the positive current collector.

A separator is disposed between the positive electrode and the negative electrode according to the procedure.

The separator has a pore diameter of 0.01 μm to 10 μm and a thickness of 5 μm to 300 μm. Specific examples may include polypropylene, polyethylene and the like olefin based polymer; or a sheet made of a glass fiber or a non-woven fabric. When a solid electrolyte such as a polymer is used as the electrolyte, a solid electrolyte may also serve as a separator.

The electrolyte may be a non-aqueous electrolyte including a non-aqueous solvent and a lithium salt, an organic solid electrolyte, an inorganic solid electrolyte, and the like.

The non-aqueous solvent may be for example, a aprotic organic solvent such as N-methyl-2-pyrrolidinone, propylene carbonate, ethylene carbonate, butylene carbonate, dimethyl carbonate, diethyl carbonate, gamma-butyro lactone, 1,2-dimethoxyethane, 2-methyl tetrahydrofuran, dimethylsulfoxide, 1,3-dioxolane, formamide, N,N-dimethyl formamide, dioxolane, acetonitrile, nitromethane, methyl formate, methyl acetate, phosphoric acid triester, trimethoxy methane, a dioxolane derivative, sulfolane, methyl sulfolane, 1,3-dimethyl-2-imidazolidinone, a propylene carbonate derivative, a tetrahydrofuran derivative, ether, methyl propionate, ethyl propionate, and the like. The lithium salt is a material that is dissolved in the non-aqueous electrolyte and non-limiting examples thereof may be LiCl, LiBr, LiI, LiClO$_4$, LiBF$_4$, LiB$_{10}$Cl$_{10}$, LiPF$_6$, LiCF$_3$SO$_3$, LiCF$_3$CO$_2$, LiAsF$_6$, LiSbF$_6$, LiAlC$_{14}$, CH$_3$SO$_3$Li, CF$_3$SO$_3$Li, (CF$_3$SO$_2$)$_2$NLi, lithium chloroborate, lower aliphatic lithium carboxylate, tetraphenyl lithium borate, imide, and the like.

Non-limiting examples of the organic solid electrolyte may be a polyethylene derivative, a polyethylene oxide derivative, a polypropylene oxide derivative, a phosphoric acid ester polymer, polyester sulfide, polyvinyl alcohol, polyvinylidene fluoride, and the like.

Non-limiting examples of the inorganic solid electrolyte may be Li$_3$N, LiI, Li$_5$NI$_2$, Li$_3$N—LiI—LiOH, LiSiO$_4$, LiSiO$_4$—LiI—LiOH, Li$_2$SiS$_3$, Li$_4$SiO$_4$, Li$_4$SiO$_4$—LiI—LiOH, Li$_3$PO$_4$—Li$_2$S—SiS$_2$, and the like.

Figure 3:
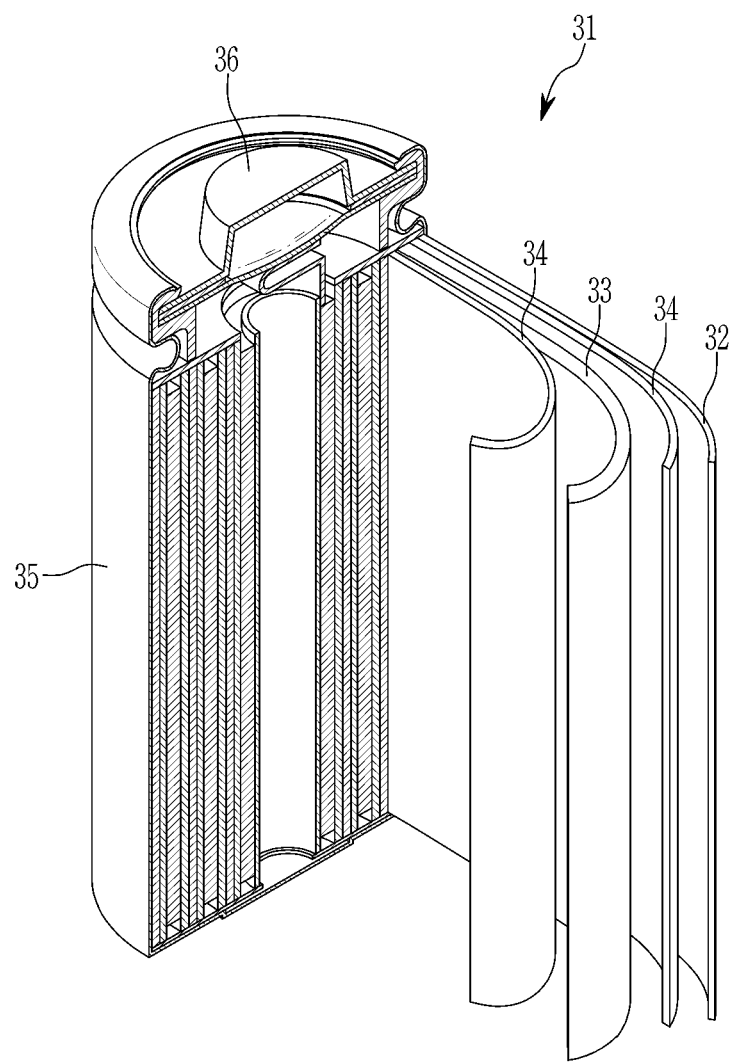
FIG. 3 is an exploded perspective view schematically showing a typical structure of a rechargeable lithium battery according to an embodiment.

FIG. 3 is an exploded perspective view schematically showing a typical structure of a rechargeable lithium battery according to an embodiment.

Referring to FIG. 3, a rechargeable lithium battery 31 includes a positive electrode including the positive active material 33 according to an embodiment, a negative electrode 32, and a separator 34. The aforementioned positive electrode 33, the negative electrode 32, and the separator 34 are wound or folded and housed in a battery case 35. Subsequently, an organic electrolyte solution is injected into the battery case 35 and sealed with a cap assembly 36 to complete a rechargeable lithium battery 31. The battery case 35 may be cylindrical, prismatic, thin film-type, and the like. For example, the rechargeable lithium battery 30 may be a large thin-film battery. The rechargeable lithium battery may be a lithium ion battery. A separator may be disposed between the positive electrode and the negative electrode to form a battery structure. After the battery structure is stacked in a bi-cell structure, it is impregnated with an organic electrolyte, and the resulting product is accommodated in a pouch and sealed to complete a lithium ion polymer battery. In addition, a plurality of the battery structures are stacked to form a battery pack, and such a battery pack may be used in all devices requiring high capacity and high output. For example, it may be used for a laptop, a smart phone, electric vehicle and so on.

In addition, the rechargeable lithium battery has excellent storage stability, cycle-life characteristics, and high-rate characteristics at high temperatures, and thus may be used in an electric vehicle (EV). For example, it may be used for a hybrid vehicle such as a plug-in hybrid electric vehicle (PHEV).

The present invention is explained in more detail in the following examples and comparative examples. It is to be understood, however, that the examples are for the purpose of illustration and are not to be construed as limiting the present invention.

Preparation Example 1: Preparation of Metal Hydroxide Precursor

Nickel sulfate (NiSO$_4$·6H$_2$O), cobalt sulfate (CoSO$_4$·7H$_2$O), and manganese sulfate (MnSO$_4$·H$_2$O) in a mole ratio of 6:2:2 as a positive active material raw material were dissolved in distilled water as a solvent to prepare a mixed solution. In order to form a complex compound, an ammonia water (NH$_4$OH) diluent, and sodium hydroxide (NaOH) as a precipitant were prepared.

Subsequently, the metal raw material mixed solution, ammonia water, and the sodium hydroxide were continuously added into a batch reactor containing the ammonia water (NH$_4$OH) diluent at the top of the reactor. In order to maintain pH inside the reactor, the sodium hydroxide was put by using a pH regulator. After performing a reaction was performed for about 20 hours, while the reactor was stirred, the input of the raw material solution was stopped.

A slurry solution in the reactor was filtered, washed with distilled water with high purity, and dried in a hot air oven for 24 hours to obtain metal hydroxide precursor (Ni$_{0.6}$Co$_{0.2}$Mn$_{0.2}$(OH)$_2$) powder.

Preparation Example 2: Preparation of Metal Hydroxide Precursor

A metal hydroxide precursor (Ni$_{0.5}$Co$_{0.2}$Mn$_{0.3}$(OH)$_2$) was obtained according to the same method as Preparation Example 1 except that the contents of the nickel sulfate, the cobalt sulfate, and the manganese sulfate were changed, and the reaction was performed for 25 hours.

Preparation Example 3: Preparation of Metal Hydroxide Precursor

A metal hydroxide precursor (Ni$_{0.8}$Co$_{0.1}$Mn$_{0.1}$(OH)$_2$) was obtained according to the same method as Preparation Example 1 except that the contents of the nickel sulfate, the cobalt sulfate, and the manganese sulfate were changed, and the reaction was performed for 25 hours.

Preparation Example 4: Preparation of Metal Hydroxide Precursor

A metal hydroxide precursor $(Ni_{0.85}Co_{0.1}Al_{0.05}(OH)_2)$ was obtained according to the same method as Preparation Example 1 except that nickel sulfate $(NiSO_4.6H_2O)$, cobalt sulfate $(CoSO_4.7H_2O)$, and aluminum nitrate $(Al(NO_3)_3.9H_2O)$ were mixed in a mole ratio of 85:10:5 and then, reacted for 18 hours.

Preparation Example 5: Preparation of Metal Hydroxide Precursor

A metal hydroxide precursor $(Ni_{0.33}Co_{0.33}Mn_{0.33}(OH)_2)$ was obtained according to the same method as Preparation Example 1 except that the contents of the nickel sulfate, the cobalt sulfate, and the manganese sulfate were changed, and the reaction was performed for 28 hours.

Example 1: Preparation of Positive Active Material

The metal hydroxide precursor $(Ni_{0.6}Co_{0.2}Mn_{0.2}(OH)_2)$ according to Preparation Example 1 and lithium hydroxide $(LiOH—H_2O)$ with an average particle diameter of about 15 μm were dry-mixed in a mole ratio of 1:1 by using a high speed mixer at 2,000 rpm, and the mixture was heat-treated in a furnace under an oxygen atmosphere at about 850° C. for 8 hours to synthesize nickel-based composite oxide $(LiNi_{0.6}Co_{0.2}Mn_{0.2}O_2)$.

The obtained nickel-based composite oxide, aluminum oxide, and PVDF were mixed to prepare a mixture. Herein, the aluminum oxide and PVDF were mixed to include aluminum elements and fluorine elements in each amount of 0.2 mol and 0.5 mol based on 100 mols of transition metal elements (Ni+Co+Nn) of the nickel-based composite oxide. The mixture was heat-treated at 350° C. for 6 hours under the oxygen atmosphere to prepare a positive active material having a coating layer including lithium fluoride, aluminum oxide, and aluminum fluoride on the surface of the nickel-based composite oxide.

Example 2: Preparation of Positive Active Material

The nickel-based composite oxide of Example 1, titanium oxide, and PVDF were mixed to prepare a mixture. Herein, the titanium oxide and PVDF were mixed to include titanium elements and fluorine elements in each amount of 0.2 mol and 0.5 mol based on 100 mols of the transition metal elements (Ni+Co+Nn) of the nickel-based composite oxide. The mixture was heat-treated at 350° C. for 6 hours under an oxygen atmosphere to prepare a positive active material having a coating layer including lithium fluoride, titanium oxide, and titanium fluoride on the surface of the nickel-based composite oxide.

Example 3: Preparation of Positive Active Material

The nickel-based composite oxide of Example 1, aluminum oxide, and PVDF were mixed to prepare a mixture. Herein, aluminum oxide and PVDF were mixed to include aluminum elements and fluorine elements in each amount of 0.2 mol and 0.5 mol based on 100 mols of the transition metal elements (Ni+Co+Nn) of the nickel-based composite oxide. The mixture was heat-treated at 450° C. for 6 hours under an oxygen atmosphere to prepare a positive active material having a coating layer including lithium fluoride, aluminum oxide, and aluminum fluoride on the surface of the nickel-based composite oxide.

Example 4: Preparation of Positive Active Material

The nickel-based composite oxide of Example 1, titanium oxide, and PVDF were mixed to prepare a mixture. Herein, the titanium oxide and PVDF were mixed to include titanium elements and fluorine elements in each amount of 0.2 mol and 0.5 mol based on 100 mols of the transition metal elements (Ni+Co+Nn) of the nickel-based composite oxide. The mixture was heat-treated at 450° C. for 6 hours under an oxygen atmosphere to prepare a positive active material having a coating layer including lithium fluoride, titanium oxide, and titanium fluoride on the surface of the nickel-based composite oxide.

Example 5: Preparation of Positive Active Material

The nickel-based composite oxide of Example 1, aluminum oxide, and PVDF were mixed to prepare a mixture. Herein, the aluminum oxide and PVDF were mixed to include aluminum elements and fluorine elements in each amount of 0.2 mol and 0.5 mol based on 100 mols of the transition metal elements (Ni+Co+Nn) of the nickel-based composite oxide. The mixture was heat-treated at 650° C. for 6 hours under an oxygen atmosphere to prepare a positive active material having a coating layer including lithium fluoride, aluminum oxide, and aluminum fluoride on the surface of the nickel-based composite oxide.

Example 6: Preparation of Positive Active Material

The nickel-based composite oxide of Example 1, titanium oxide, and PVDF were mixed to prepare a mixture. Herein, the titanium oxide and PVDF were mixed to include titanium elements and fluorine elements in each ratio of 0.2 mol and 0.5 mol based on 100 mols of the transition metal elements (Ni+Co+Nn) of the nickel-based composite oxide. The mixture was heat-treated at 650° C. for 6 hours under an oxygen atmosphere to prepare a positive active material having a coating layer including lithium fluoride, titanium oxide, and titanium fluoride on the surface of the nickel-based composite oxide.

Comparative Example 1: Preparation of Positive Active Material

A positive active material coated with lithium fluoride was prepared according to the same method as Example 1 except that PVDF alone was mixed with the nickel-based composite oxide to include 0.5 mol of the fluorine elements based on 100 mols of the transition metal elements (Ni+Co+Nn).

Comparative Example 2: Preparation of Positive Active Material

A positive active material was prepared according to the same method as Example 1 except that the aluminum oxide and PVDF were not used.

Evaluation of Residual Lithium

The positive active materials according to Example 1 and 2 and Comparative Example 2 were measured with respect to amounts of residual $Li_2O_3$ and residual LiGH and a concentration of residual Li, and the results are shown in Table 1.

TABLE 1

|  | Residual $Li_2O_3$ amount (wt %) | Residual LiOH amount (wt %) | Residual Li concentration (ppm) |
| --- | --- | --- | --- |
| Example 1 | 0.131 | 0.276 | 1048 |
| Example 2 | 0.118 | 0.280 | 1032 |
| Comparative Example 2 | 0.234 | 0.362 | 1489 |

Referring to Table 1, residual lithium of the positive active materials of Examples 1 and 2 was effectively reduced, compared with that of the positive active material of Comparative Example 2.

Coating Layer Analysis

Figure 4:
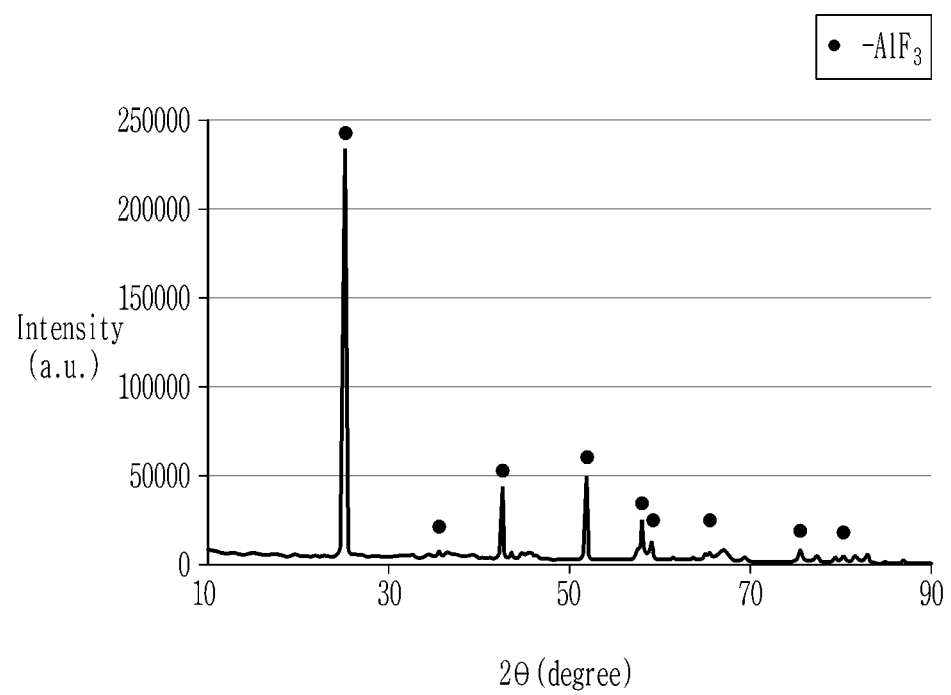
FIG. 4 is a view showing the results of X-ray diffraction analysis of a product obtained by firing aluminum oxide and polyvinylidene fluoride (PVDF) at 650° C.

In order to confirm reactivity of the metal oxides and the fluorine-based organic material used in the examples, aluminum oxide and PVDF were dry-mixed in an element ratio of Al:F=1:3 and then, heat-treated at 650° C. for 6 hours under an oxygen atmosphere. Subsequently, an X-ray diffraction analysis (XRD) was performed with respect to the obtained product, and the result is shown in FIG. 4. FIG. 4 shows the X-ray diffraction analysis result of the product obtained through firing the aluminum oxide and PVDF at 650° C. The diffraction analysis was performed at 1 degree per minute from 10 degrees to 90 degrees by using an X'PERT equipment.

The diffraction analysis result of FIG. 4 showed that aluminum oxide and metal fluoride (e.g., $AlF_3$) were produced.

Example 7: Manufacture of Coin Cell

A mixture of 96 g of the positive active material according to Example 1, 2 g of polyvinylidene fluoride, 137 g of N-methylpyrrolidone as a solvent, and 2 g of carbon black as a conductive agent were treated with a mixer to remove air bubbles to prepare uniformly-dispersed slurry for a positive active material layer.

The slurry for a positive active material layer was coated into a thin electrode plate form on an aluminum foil with a doctor blade, dried at 135° C. for 3 hours or more, and then, compressed and vacuum-dried to manufacture a positive electrode.

The positive electrode and a lithium metal as a counter electrode were used to manufacture a coin half-cell. Between the positive electrode and the lithium metal counter electrode, a porous polyethylene (PE) film as a separator (a thickness: about 16 μm) was disposed, and an electrolyte solution was injected thereinto to manufacture the coin cell. Herein, the electrolyte solution was prepared by mixing ethylenecarbonate (EC) and ethylmethylcarbonate (EMC) in a volume ratio of 3:5 and dissolving 1.1 M $LiPF_6$ therein.

Examples 8 to 10 and Comparative Examples 3 and 4: Manufacture of Coin Cells

Each coin cell was manufactured according to the same method as Example 1 except that the positive active materials according to Examples 2 to 6 and Comparative Examples 1 and 2 were respectively used instead of the positive active material according to Example 1.

Evaluation of Battery Cell Characteristics

The coin cells according to Examples 7 and 8 and Comparative Examples 3 and 4 were once charged and discharged at 0.1 C (18 mAh/g) for formation and subsequently, once charged and discharged at 0.2 C as initial charge and discharge. Discharge capacity at the initial charge and discharge, charge and discharge efficiency, and 0.2 C discharge capacity were evaluated. The results of Examples 7 and 8 and Comparative Example 3 are shown in Table 2.

TABLE 2

|  | 0.1 C initial capacity (mAh/g) | charge and discharge efficiency (%) | 0.2 C capacity (mAh/g) |
| --- | --- | --- | --- |
| Example 7 | 185.1 | 94.4 | 183.1 |
| Example 8 | 184.9 | 94.3 | 183.0 |
| Comparative Example 3 | 183.2 | 93.5 | 182.4 |

Referring to Table 2, the cells (Examples 7 and 8) respectively including the positive active materials according to Examples 1 and 2 exhibited excellent charge and discharge efficiency and capacity, compared with the cell (Comparative Example 3) including the positive active material according to Comparative Example 1.

Figure 5:
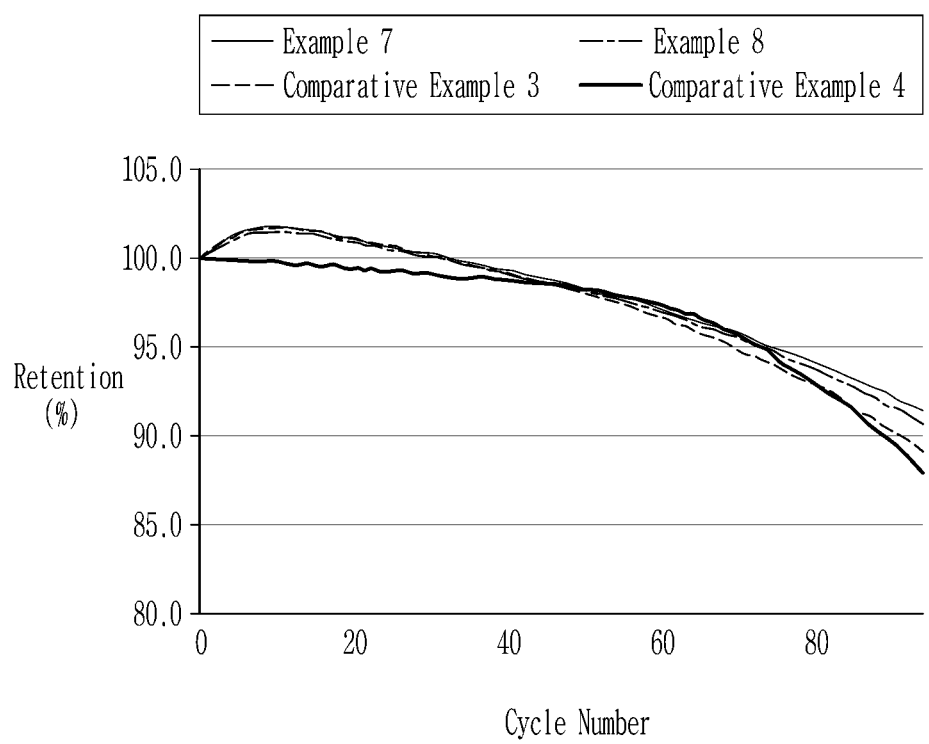
FIG. 5 is a graph showing the results of evaluating cycle-life characteristics of coin cells manufactured according to Examples 7 and 8 and Comparative Examples 3 and 4.

Cycle-life characteristics of the coin cells according to Examples 7 and 8 and Comparative Examples 3 and 4 were evaluated as follows. The cells were once charged and discharged at 0.1 C (18 mAh/g) for formation and then, 50 times repeatedly charged and discharged at 1 C (180 mAh/g) at 45° C. to examine cycle characteristics. The charge was set to start in a CC (constant current) mode and then, changed into a CV (constant voltage) mode and cut off at 4.3 V and 0.05 C, and the discharge was set to start in the CC (constant current) mode and cut off at 3.0 V. The results are shown in FIG. 5. FIG. 5 is a graph showing cycle-life characteristics results of the coin cells according to Examples 7 and 8 and Comparative Examples 3 and 4.

Referring to FIG. 5, the cells (Examples 7 and 8) respectively including the positive active material of Example 1 having a coating layer including lithium fluoride, aluminum oxide, and aluminum fluoride and the positive active material of Example 2 having a coating layer including lithium fluoride and aluminum fluoride, wherein the metal oxide and/or the metal fluoride reduced a side reaction during a reaction of the surface of the nickel-based composite oxide with the electrolyte solution, exhibited improved long-term cycle-life characteristics, compared with the cell (Comparative Example 3) including the positive active material of Comparative Example 1 including a fluorine-based organic material alone and the cell (Comparative Example 4) including the positive active material of Comparative Example 2 having no coating. Accordingly, as for the positive active materials of Example 1 and Example 2, the coating layer was regarded to effectively protect the surface of the nickel-based composite oxide.

In the above, embodiments have been described with reference to the drawings and examples, but these are only exemplary, and those of ordinary skill in the art can understand that various modifications and other equivalent embodiments are possible therefrom. Therefore, the scope of protection of the present invention should be determined by the appended claims.

DESCRIPTION OF SYMBOLS

1: positive active material
3: nickel-based composite oxide

5: coating layer
10: primary particle
20: secondary particle
31: rechargeable lithium battery
32: negative electrode
33: positive electrode
34: separator
35: battery case
36: cap assembly

The invention claimed is:

1. A positive active material for a rechargeable lithium battery, comprising
a nickel-based composite oxide having a nickel content of greater than or equal to 60 mol % relative to a total amount of metal excluding lithium and a coating layer on the surface of the nickel-based composite oxide,
wherein the coating layer comprises:
lithium fluoride (LiF) produced through a reaction of residual lithium of the nickel-based composite oxide with fluorine of a fluorine-based organic material; and
a metal fluoride produced by firing a metal oxide and the fluorine-based organic material, and
wherein the lithium fluoride and metal fluoride are present in a form of nano-sized particulates having a size of greater than or equal to 5 nm and less than or equal to 40 nm.

2. The positive active material of claim 1, wherein the nickel-based composite oxide is a metal composite oxide represented by Chemical Formula 1:

$$Li_a(Ni_{1-x-y-z}Co_xMn_yM_z)O_2 \quad \text{[Chemical Formula 1]}$$

wherein, in Chemical Formula 1, M is an element selected from boron (B), magnesium (Mg), calcium (Ca), strontium (Sr), barium (Ba), titanium (Ti), vanadium (V), chromium (Cr), iron (Fe), copper (Cu), zirconium (Zr), and aluminum (Al),
$0.95 \leq a \leq 1.3$, $x \leq (1-x-y-z)$, $y \leq (1-x-y-z)$, $0 < x < 1$, $0 \leq y < 1$, and $0 \leq z < 1$.

3. The positive active material of claim 1, wherein the coating layer has a thickness of 20 nm to 70 nm.

4. The positive active material of claim 1, wherein the coating layer comprises 10 wt % to 90 wt % of the lithium fluoride and 10 wt % to 90 wt % of the metal fluoride.

5. The positive active material of claim 1, wherein the metal oxide is an oxide including an element selected from a transition metal other than nickel, a Group 13 element capable of reacting with fluorine, and a Group 14 element capable of reacting with fluorine.

6. The positive active material of claim 1, wherein the metal oxide is selected from aluminum oxide, titanium oxide, zirconium oxide, and a combination thereof.

7. The positive active material of claim 1, wherein the fluorine-based organic material is a polymer having a melting point of 150° C. to 400° C.

8. The positive active material of claim 1, wherein the fluorine-based organic material is a polymer or a mixture thereof prepared by polymerizing at least one monomer selected from vinylidene fluoride, tetrafluoroethylene, hexafluoropropylene, chlorotrifluoroethylene, vinyl fluoride, trifluoroethylene, hexafluoroisobutylene, perfluorobutylethylene, perfluoropropyl vinyl ether, perfluoroethyl vinyl ether, perfluoromethyl vinyl ether, perfluoro-2,2-dimethyl-1,3-dioxole, and perfluoro-2-methylene-4-methyl-1,3-dioxolane.

9. The positive active material of claim 1, wherein the coating layer further comprises the metal oxide.

10. The positive active material of claim 1, wherein the nickel-based composite oxide comprises a secondary particle in which a plurality of primary particles are agglomerated, wherein the secondary particle has a predetermined arrangement structure in which (003) planes of primary particles are aligned to be in a vertical direction with respect to a tangent line at a point (P) at which the (003) planes of the primary particles meet a surface of the secondary particle.

11. The positive active material of claim 10, wherein 50% or more of the primary particles are arranged to be in a vertical direction with respect to the tangent line at the point (P) at which the (003) planes meets the surface of the secondary particle.

12. The positive active material of claim 10, wherein a length in the c-axis direction of the primary particles is in the range of 100 nm to 200 nm.

13. The positive active material of claim 10, wherein the secondary particle has a radial array structure having one center or a multi-core radial array structure having a plurality of centers.

14. The positive active material of claim 10, wherein a pore volume fraction of micropores of less than or equal to 10 nm of the secondary particle is greater than or equal to 10% of a total pore volume.

15. A method of preparing the positive active material for a rechargeable lithium battery, comprising
heat-treating a mixture of a metal oxide and a fluorine-based organic material in an oxidizing atmosphere at a temperature of greater than or equal to 350° C. and less than or equal to 650° C., which is equal to or higher than the melting point of the fluorine-based organic material in the presence of the nickel-based composite oxide having a nickel content of greater than or equal to 60 mol % relative to a total amount of metal excluding lithium to prepare the positive active material for a rechargeable lithium battery of claim 1.

16. The method of claim 15, wherein the metal oxide and the fluorine-based organic material are mixed in a weight ratio of 30:70 to 70:30 and then fired.

* * * * *